(12) United States Patent
Lethellier

(10) Patent No.: US 10,873,213 B2
(45) Date of Patent: Dec. 22, 2020

(54) WIRELESS POWER TRANSFER PAD WITH FERRITE PYRAMID-SHAPED CHIMNEY

(71) Applicant: Wireless Advanced Vehicle Electrification, Inc., Salt Lake City, UT (US)

(72) Inventor: Patrice Lethellier, Herriman, UT (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 175 days.

(21) Appl. No.: 16/124,035

(22) Filed: Sep. 6, 2018

(65) Prior Publication Data

US 2019/0074135 A1 Mar. 7, 2019

Related U.S. Application Data

(60) Provisional application No. 62/554,950, filed on Sep. 6, 2017, provisional application No. 62/554,960, filed on Sep. 6, 2017.

(51) Int. Cl.
*H02J 50/10* (2016.01)
*H01F 38/14* (2006.01)
(Continued)

(52) U.S. Cl.
CPC .............. *H02J 50/10* (2016.02); *H01F 27/24* (2013.01); *H01F 27/255* (2013.01); *H01F 27/28* (2013.01); *H01F 27/2871* (2013.01); *H01F 27/36* (2013.01); *H01F 27/40* (2013.01); *H01F 38/14* (2013.01); *H02J 7/0042* (2013.01); *H02J 7/025* (2013.01); *H02J 50/12* (2016.02); *B60L 53/12* (2019.02)

(58) Field of Classification Search
CPC ........ H01F 38/14; H01F 27/24; H01F 27/255; H01F 27/28; H01F 27/2871; H01F 27/365; H01F 27/40; H02J 50/12; H02J 7/0042; H02J 7/025; H02J 50/10; B60L 53/12

See application file for complete search history.

(56) References Cited

U.S. PATENT DOCUMENTS

2010/0181842 A1 7/2010 Suzuki et al.
2010/0253153 A1 10/2010 Kondo et al.
(Continued)

OTHER PUBLICATIONS

International Application No. PCT/US18/49783, International Search Report, dated Dec. 20, 2018, pp. 1-2.
(Continued)

*Primary Examiner* — Carlos Amaya
(74) *Attorney, Agent, or Firm* — Kunzler Bean & Adamson; Bruce R. Needham

(57) ABSTRACT

A wireless power transfer ("WPT") pad with a pyramid-shaped ferrite chimney is disclosed. The WPT pad includes a winding comprising a conductor where the conductor is wound in a planar configuration. The winding includes a center point about which the winding is wound. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section.

18 Claims, 6 Drawing Sheets

(51) Int. Cl.
| | |
|---|---|
| *H02J 7/02* | (2016.01) |
| *H02J 50/12* | (2016.01) |
| *H01F 27/28* | (2006.01) |
| *H02J 7/00* | (2006.01) |
| *H01F 27/255* | (2006.01) |
| *H01F 27/36* | (2006.01) |
| *H01F 27/24* | (2006.01) |
| *H01F 27/40* | (2006.01) |
| *B60L 53/12* | (2019.01) |

(56) References Cited

U.S. PATENT DOCUMENTS

| | | |
|---|---|---|
| 2011/0127845 A1 | 6/2011 | Walley et al. |
| 2013/0181668 A1 | 7/2013 | Tabata et al. |
| 2017/0040845 A1* | 2/2017 | Yuasa ................ H01F 3/10 |
| 2018/0269716 A1* | 9/2018 | Jang ................ H01F 27/306 |
| 2018/0287411 A1* | 10/2018 | Lee ................ H04B 5/0081 |

OTHER PUBLICATIONS

International Application No. PCT/US18/49783, International Preliminary Report on Patentability, dated Mar. 10, 2020, pp. 1-5.
U.S. Appl. No. 16/124,025, Office Action, dated Apr. 29, 2020, pp. 1-15.

* cited by examiner

WIRELESS POWER TRANSFER PAD WITH FERRITE PYRAMID-SHAPED CHIMNEY

CROSS-REFERENCES TO RELATED APPLICATIONS

This application claims the benefit of U.S. Provisional Patent Application No. 62/554,950 entitled "WIRELESS POWER TRANSFER PAD WITH FERRITE CHIMNEY" and filed on Sep. 6, 2017 for Patrice Lethellier, and U.S. Provisional Patent Application No. 62/554,960 entitled "WIRELESS POWER TRANSFER PAD WITH FERRITE PYRAMID-SHAPED CHIMNEY" and filed on Sep. 6, 2017 for Patrice Lethellier, the entire contents of which are incorporated herein by reference for all purposes.

FIELD

This invention relates to wireless power transfer and more particularly relates to wireless power transfer pads.

BACKGROUND

Wireless power transfer is becoming increasingly popular. Wireless power transfer involves transmitting power from a primary pad located on a stationary wireless power transfer device, such as a charging station, to a secondary pad on a mobile device, such as an electric vehicle, over a significant gap. The gap typically includes an air gap and can be significant. For example, the air gap may be from ground level to a secondary pad located under a vehicle. An air gap in the range of six inches to 10 inches is not uncommon. As the amount of power transferred over an air gap increases, voltages for transmission and reception systems has increased. One method of wireless power transfer includes using a resonant tank, which often boosts voltages of a wireless power transfer pad, which increases voltage ratings of components used for the equipment. As voltages increase, electromagnetic field strengths increase, which may pose a danger to people exposed to the electromagnetic radiation. Various methods are used in wireless power transfer to direct electromagnetic fields in a particular direction and to increase efficiency of the wireless power transfer.

SUMMARY

A wireless power transfer ("WPT") pad with a pyramid-shaped ferrite chimney is disclosed. The WPT pad includes a winding comprising a conductor where the conductor is wound in a planar configuration. The winding includes a center point about which the winding is wound. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section.

Another WPT pad with a pyramid-shaped ferrite chimney is disclosed.

The WPT pad includes a winding comprising a conductor where the conductor is wound in a planar configuration. The winding includes a center point about which the winding is wound. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section where the chimney section extends in a direction from the parallel section toward the winding. The chimney section includes a top distal to the parallel section and sides between the top and the parallel section, where the sides of the chimney section include a slope where each side is wider at the parallel section than at the top of the chimney section.

A WPT system with a pyramid-shaped ferrite chimney is disclosed. The WPT system includes a resonant converter that receives power from a power source and a WPT pad connected to the resonant converter, where the WPT pad receives power from the resonant converter. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
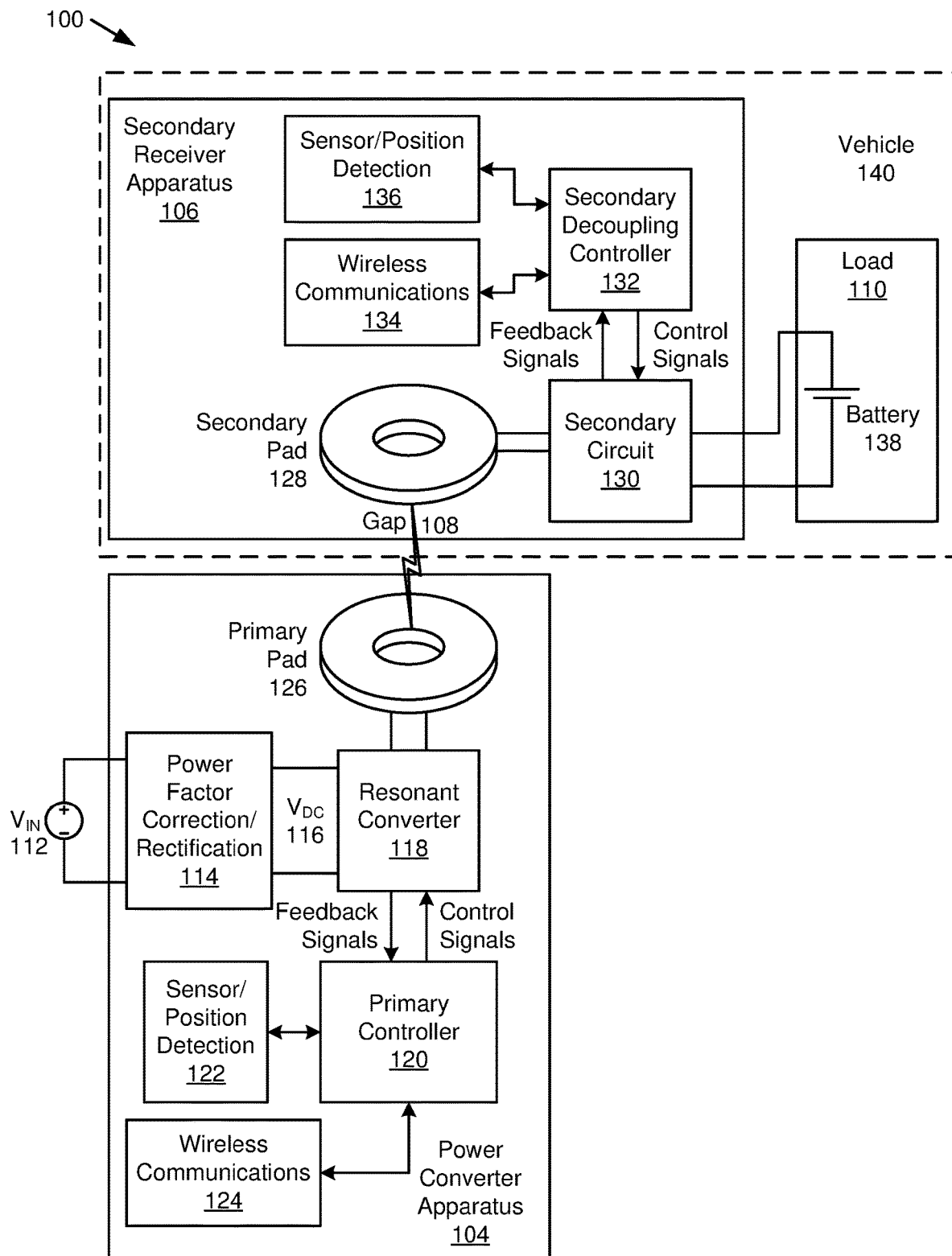
FIG. 1 is a schematic block diagram illustrating one embodiment of a system with a wireless power transfer ("WPT") pad with a pyramid-shaped ferrite chimney.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A wireless power transfer ("WPT") pad with a pyramid-shaped ferrite chimney is disclosed. The WPT pad includes a winding comprising a conductor where the conductor is wound in a planar configuration. The winding includes a center point about which the winding is wound. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section.

In some embodiments, the chimney section extends in a direction from the parallel section toward the winding. The chimney section includes a top distal to the parallel section and sides between the top and the parallel section. In other embodiments, the sides of the chimney section include a slope wherein each side is wider at the parallel section than at the top of the chimney section. In further embodiments, the slope of the sides is chosen to accommodate an expected amount of magnetic flux from the parallel section through the chimney section and through the top where the slope accommodates the expected amount of magnetic flux without saturation of the chimney section.

In other embodiments, the top has a width sized to accommodate an expected magnetic flux through the top without saturation of the chimney section. In other embodiments, the chimney section extends away from the parallel section a distance at least a thickness of the winding, where the thickness is measured in a direction perpendicular to the parallel section of the ferrite structure. In further embodiments, the chimney section extends a distance beyond the thickness of the winding.

In some embodiments, the chimney section is positioned within a center section of the winding. In other embodiments, the ferrite structure includes an exterior section located exterior to an outside edge of the winding, where the outside edge is distal to the chimney section. The exterior section is in magnetic contact with the parallel section and extends perpendicular to the parallel section. In further embodiments, the exterior section extends in a direction from the parallel section toward the winding and a distance at least a thickness of the winding, the thickness measured in a direction perpendicular to the ferrite structure.

In some embodiments, an end of the winding is located at an exterior edge of a center section about the center point and is wound in a circular pattern that expands from the center point within the center section, where each succeeding lap of the winding is external to a previous lap of the winding. In further embodiments, each lap of the winding is within a same plane, the plane parallel to the parallel section of the ferrite structure. In other embodiments, the WPT pad includes two or more windings where each winding includes a parallel section of a ferrite structure associated with the winding and a center section. Each center section includes a chimney section of the ferrite structure associated with the winding. In further embodiments, the ferrite structures of each of the two or more windings are adjacent to each other and are magnetically coupled.

In some embodiments, the WPT pad is configured to couple with an opposing WPT pad where the WPT pad is a transmitter pad that transmits power wirelessly to an opposing WPT pad that is a secondary pad or secondary pad that receives power wirelessly from an opposing WPT pad that is a transmitter pad. In further embodiments, the opposing WPT pad has a center section and a chimney section on each side of the center section adjacent to a winding of the opposing WPT pad. In other embodiments, the WPT pad is part of a wireless power transfer system that transfers power wirelessly to a vehicle.

Another WPT pad with a pyramid-shaped ferrite chimney is disclosed. The WPT pad includes a winding comprising a conductor where the conductor is wound in a planar configuration. The winding includes a center point about which the winding is wound. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section where the chimney section extends in a direction from the parallel section toward the winding. The chimney section includes a top distal to the parallel section and sides between the top and the parallel section, where the sides of the chimney section include a slope where each side is wider at the parallel section than at the top of the chimney section.

In some embodiments, the chimney section and the exterior section each extend away from the parallel section a distance at least a thickness of the winding, where the thickness is measured in a direction perpendicular to the parallel section of the ferrite structure.

A WPT system with a pyramid-shaped ferrite chimney is disclosed. The WPT system includes a resonant converter that receives power from a power source and a WPT pad connected to the resonant converter, where the WPT pad receives power from the resonant converter. The WPT pad includes a ferrite structure that includes a parallel section located on a side of the winding with at least a portion in parallel with the winding and a chimney section in magnetic contact with the parallel section and located at the center point of the winding. The chimney section extends perpendicular to the parallel section.

FIG. 1 is a schematic block diagram illustrating one embodiment of a wireless power transfer ("WPT") system 100 with a WPT pad with a pyramid-shaped ferrite chimney. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, includes a resonant converter 118 that receives a direct current ("DC") voltage from a DC bus 116. In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 that receives power from the resonant converter 118. In one embodiment, portions of the resonant converter 118 and primary pad 126 form a resonant circuit that enables efficient wireless power transfer across the gap 108. The gap 108, in some embodiments includes an air gap, but may also may partially or totally include other substances. For example, where the primary pad 126 is in a roadway, the gap 108 may include a resin, asphalt, concrete, plastic or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 connected to a secondary circuit 130 that delivers power to the load 110. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other load that would benefit from receiving power wirelessly.

In one embodiment, the secondary circuit 130 includes a portion of resonant circuit that interacts with the secondary pad 128 and that is designed to receive power at a resonant frequency. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIG. 2.

Figure 2:
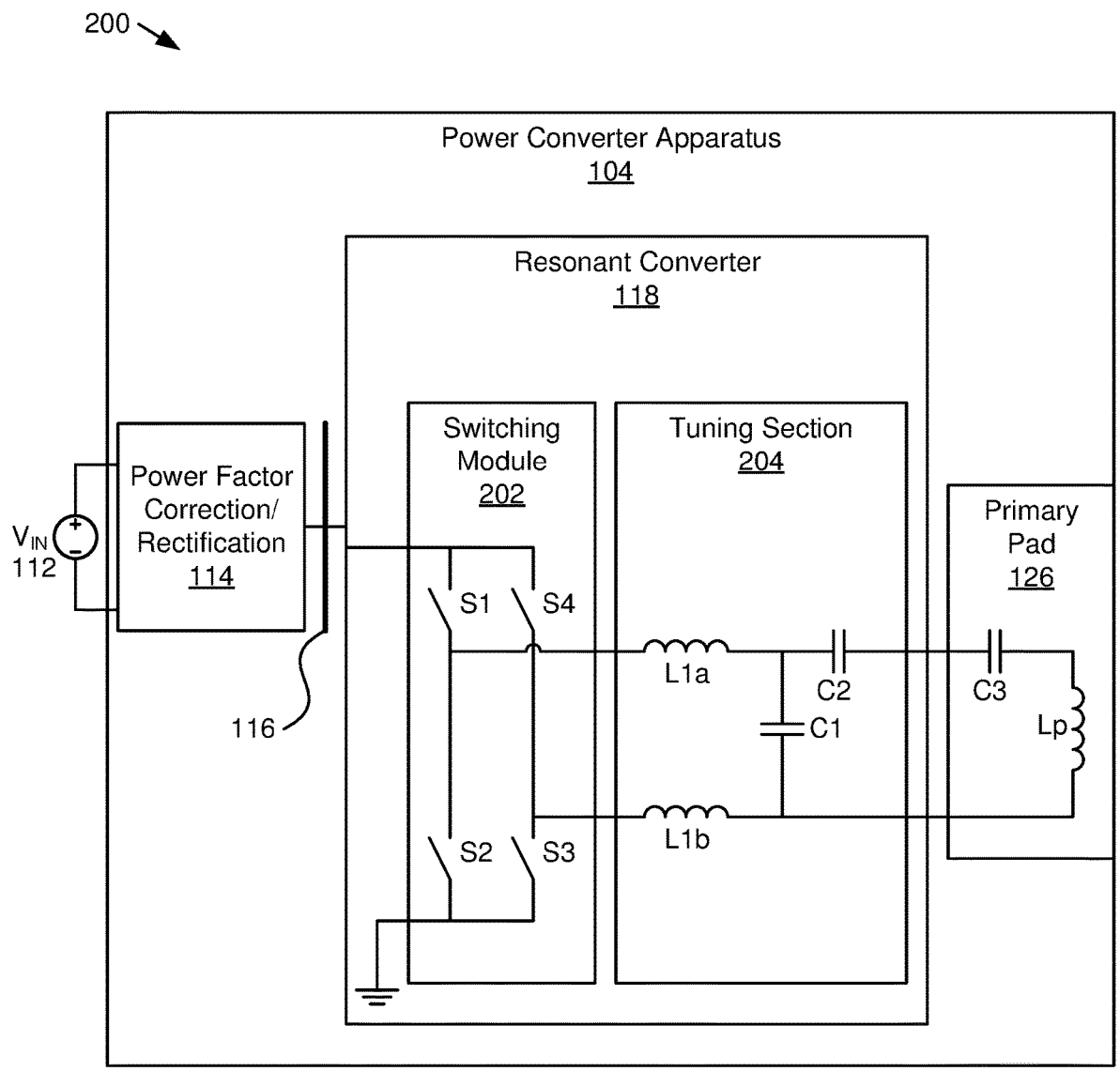
FIG. 2 is a schematic block diagram illustrating one embodiment of a power converter apparatus.

FIG. 2 is a schematic block diagram illustrating one embodiment of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. The switching module 202, includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section simulating an AC waveform. The AC waveform typically imperfect due to harmonics.

Typically switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2 includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. While the apparatus 200 of FIG. 2 is focused on the resonant converter 118 and primary pad 126, the secondary receiver apparatus 106 includes a secondary pad 128 and a secondary circuit 130 that typically includes a tuning section where the inductance of the secondary pad 128 and capacitance of the tuning section of the secondary circuit 130 form a resonant frequency and the secondary pad 128 and secondary circuit 130 have voltage issues similar to the primary pad 126 and resonant converter 118.

Figure 3A:
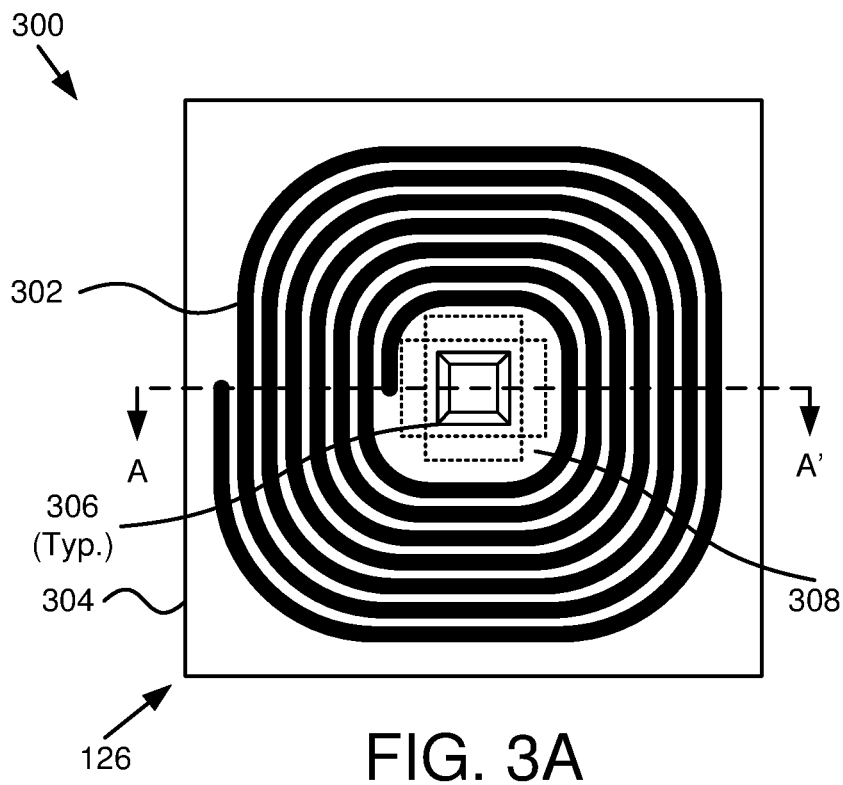
FIG. 3A is a schematic block diagram plan view of one embodiment of a WPT pad with a pyramid-shaped ferrite chimney in a center of the WPT pad.
Figure 3B:
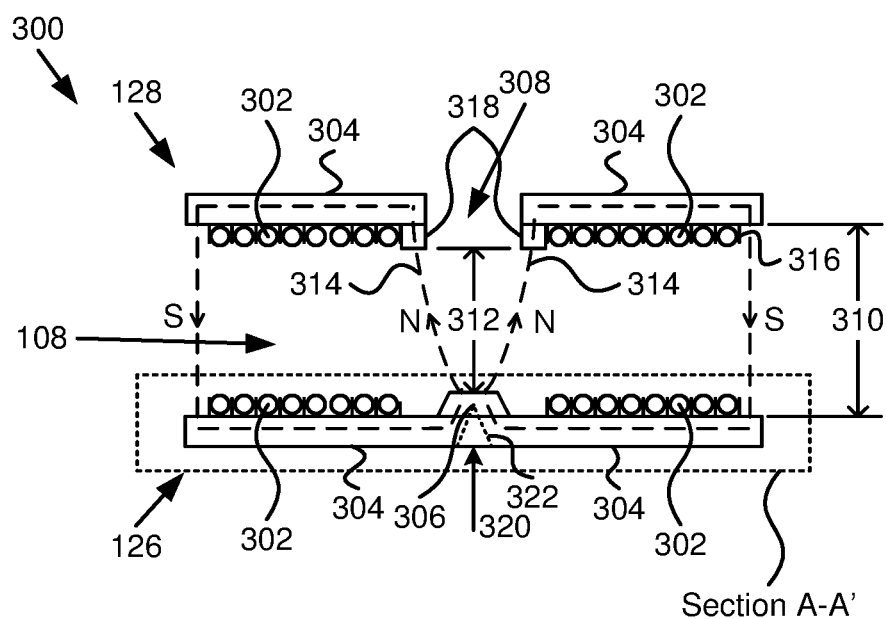
FIG. 3B is a schematic block diagram section view of a WPT pad represented in FIG. 3A along with an opposing WPT pad with a chimney section.

FIG. 3A is a schematic block diagram plan view of one embodiment 300 of a WPT pad 126 with a pyramid-shaped ferrite chimney section 306 in a center of the WPT pad 126. FIG. 3B is a schematic block diagram section view of a WPT pad 126 represented in FIG. 3A along with an opposing WPT pad 128 with a chimney section 318. While the primary pad 126 is depicted with the pyramid-shaped chimney section 306 in the embodiment depicted in FIG. 3B, the WPT pad 126 can be a primary pad 126 or a secondary pad 128.

The WPT pads 126 each include a winding 302 parallel to a parallel section 304 of a ferrite structure. The ferrite structure also includes a chimney section 306 located at a center point 320 about which the winding 302 is wound. The winding 302 includes a conductor wound in a planar configuration about the center point 320. An opposing winding, in this instance the secondary pad 128, includes a ferrite structure with a parallel section 304 and an open center section 308. The ferrite structure of the opposing WPT pad 128 includes a chimney section 318 on either side of the center section 308 adjacent to the winding 302.

Typically, the winding 302 is not wound with an empty space in the center for a variety of reasons. For example, bending radius of the conductor may prevent a tight winding 302 without an open center section. In another example, including the conductor in the center section 308 may be less efficient than leaving an open center section because conductors in the center section 308 may not contribute significantly to the magnetic field directed toward an opposing pad. One of skill in the art will recognize other reasons for an open center section 308.

FIG. 3B is a cross section of both a primary pad 126, see Section A-A', and an opposing WPT pad, which is a secondary pad 128. The primary pad 126 and the secondary pad 128 may have similar layout for most features except for the chimney sections 306, 318. The WPT pad 126 may include separators 316 or some other structure to keep the winding 302 in place. The conductors of the winding 302 are depicted in FIG. 3B as round for convenience, but may be oblong, square, rectangular or another shape and may be litz wire or some other multi-strand conductor. Typically, the winding 302 of the primary pad 126 and the secondary pad 128 are facing each other, which helps to direct the magnetic field between the WPT pads 126. A simplified magnetic pathway 314 is depicted where the center section forms a north pole and the exterior edges of the WPT pads 126 form a south pole. Note that the ferrite structure does not extend into the center section 308 for the secondary pad 128 but extends through the center part of the primary pad 126, which is discussed below. In another embodiment, the ferrite structure of the secondary pad 128 includes a center section 308 with ferrite material.

While the winding 302 in FIG. 3A is depicted as a single conductor, other configurations may include two or more conductors wound in parallel, which may reduce voltage requirements of the WPT pads 126, 128. In one embodiment, the winding 302 is wound in a single layer in a planar configuration starting at a center point 320 and each wrap is laid external to a previous wrap. For example, the winding 302 may be in a Euclidean spiral or in a shape similar to a Euclidean spiral, such as depicted in FIG. 3A where the spiral of the winding 302 is not circular but is more square or rectangular shaped. A winding 302 in this Euclidean spiral-like shape is beneficial for wireless power transfer in shaping an electromagnetic field from a primary pad 126 directed toward a secondary pad 128. In other embodiments, the winding 302 may include two or more layers of conductors.

The parallel section 304 is located on a side of the winding 302 with at least a portion in parallel with the winding 302. The depicted embodiment, as can be seen in FIG. 3B, includes a parallel section 304 that is rectangular. Other shapes may be used where at least a portion in parallel with the winding 302. For example, the ferrite structure may have split shape as described in U.S. patent application Ser. No. 15/456,402 filed Mar. 10, 2016 for Patrice Lethellier, which is incorporated herein by reference for all purposes. In some embodiments, the parallel section 304 of the ferrite structure includes ferrite bars in a radial pattern extending from the center section 308. In other embodiments, the parallel section 304 is made up of two or more ferrite elements that are in contact with each other or are close enough to form a magnetic pathway through the parallel section 304. One of skill in the art will recognize other designs of a parallel section 304 that include at least a portion in parallel with the winding 302.

The chimney sections 306, 318 are in in magnetic contact with the parallel section 304 and are located in the center section 308 or center point 320 of the winding 302. The chimney sections 306, 318 extend in a direction perpendicular to the parallel section 304. Typically, the primary pad 126 and the secondary pad are separated by a gap 108 where the parallel sections 304 are a distance 310 from each other. At the chimney section 306, 318, the distance 312 is reduced within the gap 108. Typically, the electromagnetic field strength in the center section 308 is stronger than in other locations. The ferrite structure provides a magnetic pathway 314 that directs a majority of the electromagnetic field, although some flux lines exist outside the ferrite structure. At the gap 108, the magnetic pathway 314 jumps across the gap 108. The chimney sections 306, 318 provide a shortened distance 312 across the gap 108 where the electromagnetic field strength is typically strong, which may increase magnetic coupling and an associated coefficient of coupling between the WPT pads 126, 128.

Typically, the winding 302 is embedded in a material, such as a resin, a plastic, asphalt, etc., which may hold the winding 302 in place and the material typically has a thickness. The thickness of the chimney sections 306, 318, in one embodiment, is a distance at least a thickness of the winding 302, where the thickness is measured in a direction perpendicular to the parallel section 304 of the ferrite structure. Due to the thickness of the winding 302, having chimney sections 306, 318 that are the thickness of the winding 302 or at least to a distance of the winding 302 beyond the parallel section 304 do not increase a total thickness of the WPT pads 126, 128. Where the chimney sections 306, 318 extends away from the parallel section 304 a distance of the thickness of the winding 302 and/or a distance of the winding 302 beyond the parallel section 304, a covering of the winding 302 may also extend across the chimney section 306 a same thickness as the covering over the winding 302.

In another embodiment, the chimney sections 306, 318 extend a distance beyond a thickness of the winding 302 and/or a distance of the winding 302 beyond the parallel section 304, which further reduces the distance 312 of the magnetic pathway 314 through the gap 108. However, in the embodiment the chimney sections 306, 318 may be exposed or may have a covering less thick than the covering over the winding 302.

The chimney sections 306, 318 may be designed based on a strength of the magnetic field at the location of the chimney section 306, 318. For example, a width of the chimney sections 306, 318 may be sufficient to prevent saturation of the ferrite material used for the chimney sections 306, 318. In the embodiment depicted in FIG. 3A, the chimney section 306 of the primary pad 126 includes pyramid-shaped elements where the chimney section 318 of the secondary pad 128 includes rectangular elements. The rectangular elements may be sized to accommodate the winding 302. Rectangular elements may be more readily available other shapes and may be used for convenience. In other embodiments, the rectangular elements may be sized to overlap to form a continuous chimney section 318. In other embodiments, the chimney section 318 includes a custom ferrite material shaped in a circle or other convenient shape. One of skill in the art will recognize other shapes of a chimney section 306.

For the pyramid-shaped chimney section 306 of the primary pad 126, the shape may be designed to be at the center point 320 of the winding 302 and may be sized and shaped for an anticipated strength of the magnetic field through the chimney section 306 and may be sized and shaped to prevent saturation of the ferrite material of the chimney section 306. Note that, in some embodiments, the pyramid-shaped chimney section 306 may have extra material in a center near the parallel section 304 that is not necessary and may be removed. A dashed line 322 is depicted in FIG. 3B indicating an approximate area of ferrite material that may be removed because the surrounding ferrite material is adequate to avoid saturation.

Figure 6:
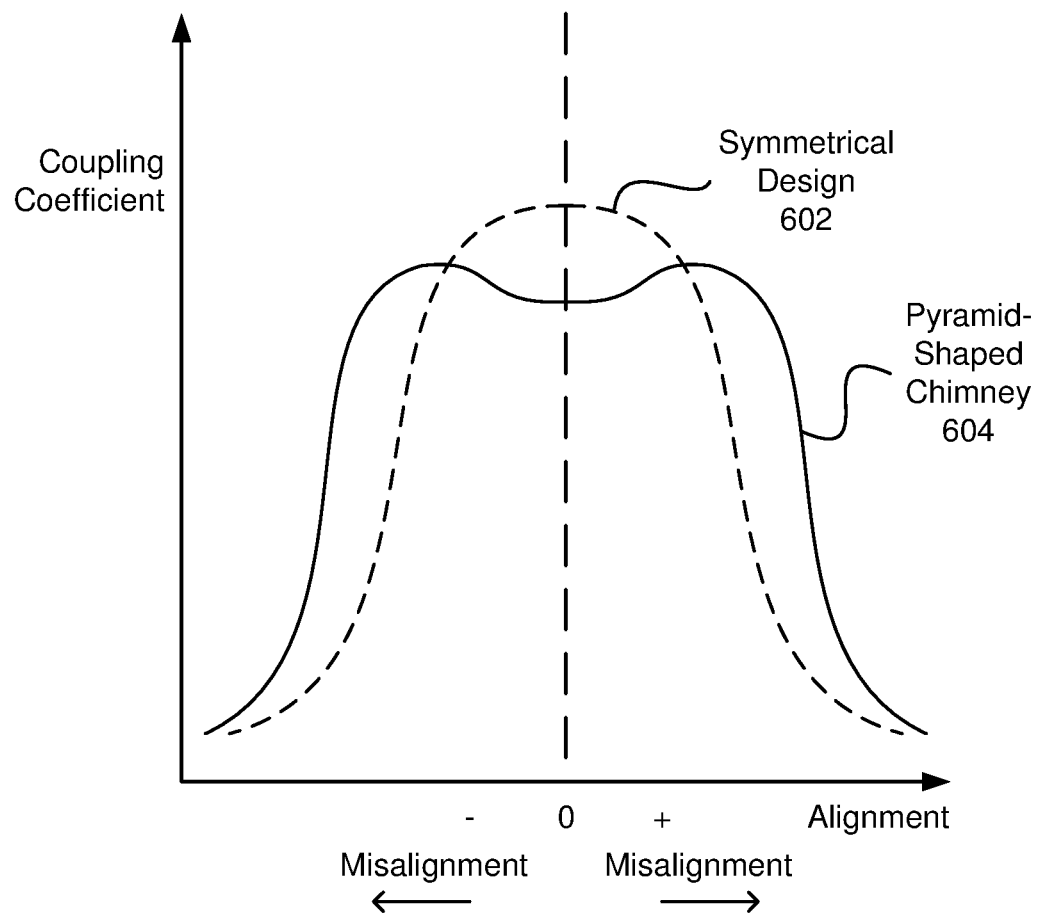
FIG. 6 is a representative graph of coupling coefficient vs alignment for a typical WPT pad and for a WPT pad with a pyramid-shaped ferrite chimney.

Having a WPT pad (e.g. 126) with a chimney section 306 with a pyramid-shape and an opposing pad (e.g. 128) with a chimney section 318 surrounding a center section 308 allows for more misalignment between the WPT pad 126 and the opposing WPT pad 128 than symmetrical WPT pads. FIG. 6 is a representative graph of coupling coefficient vs alignment for a typical WPT pad and for a WPT pad 126 with a pyramid-shaped ferrite chimney section 306. For a typical WPT pad with a symmetrical design of the pads, the coupling coefficient 602 typically has a peak coupling coefficient when the pads are aligned. For a WPT system 100 with a pyramid-shaped chimney section 306, the coupling coefficient 604 has a lower peak, but maintains a higher coupling coefficient over a wider range of misalignment than the coupling coefficient 602 of a symmetrical design. Thus, having a single chimney on the WPT pad 126 and two chimneys or no chimneys on an opposing WPT pad 128 provides a wider range of misalignment. Having the pyramid-shaped WPT pad 126 may sacrifice a higher coupling coefficient when highly aligned.

Figure 4A:
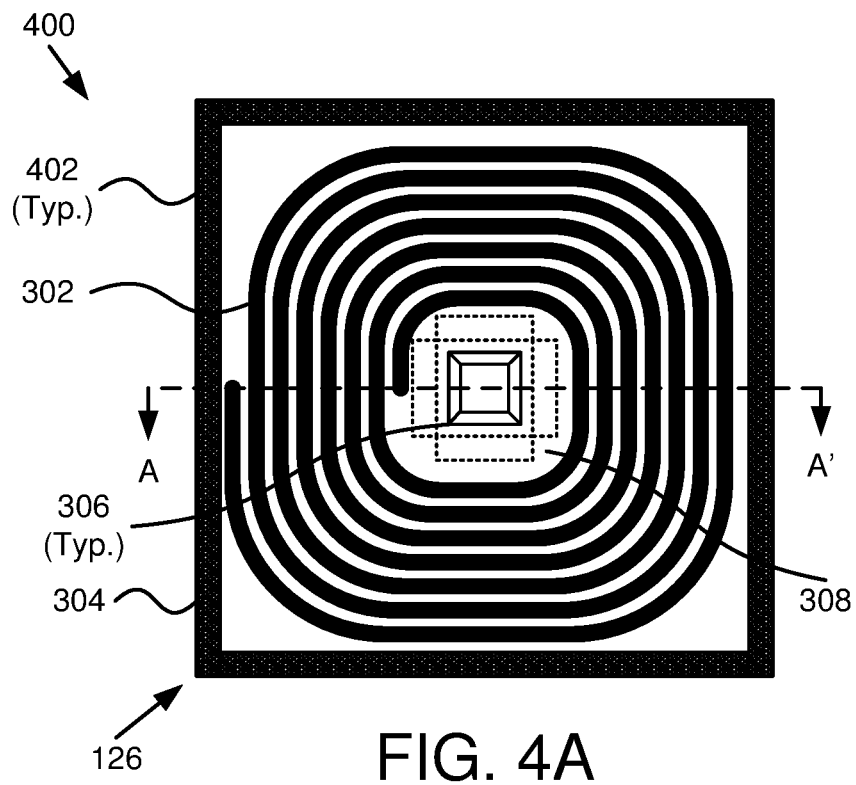
FIG. 4A is a schematic block diagram plan view of one embodiment of a WPT pad with a pyramid-shaped ferrite chimney in a center and a ferrite chimney exterior edge of the WPT pad.
Figure 4B:
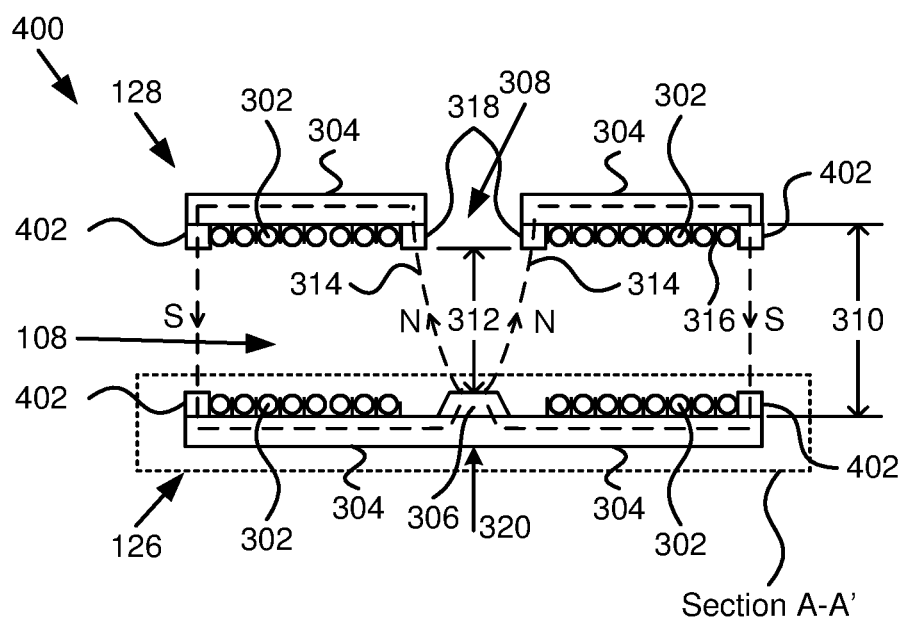
FIG. 4B is a schematic block diagram section view of WPT pads represented in FIG. 4A along with an opposing WPT pad with a chimney section and an exterior section.

FIG. 4A is a schematic block diagram plan view of one embodiment 400 of a WPT pad 126 with a pyramid-shaped ferrite chimney in a center and a ferrite chimney on an exterior edge of the WPT pad 126. FIG. 4B is a schematic block diagram section view of a WPT pad 126 represented in FIG. 4A along with an opposing WPT pad 128 with a chimney section 318 and an exterior section 402. In the embodiment 400, the WPT pads 126, 128 are the same as the embodiment 300 of FIGS. 3A and 3B but the ferrite structure includes an exterior section 402 around the perimeter of the parallel section 304. Discussion of the embodiment 300 of FIGS. 3A and 3B are substantially applicable to the embodiment 400 of FIGS. 4A and 4B.

The exterior section 402, in one embodiment, is located exterior to an outside edge of the winding 302, and the outside edge is distal to an inside edge adjacent to the center section 308 of the winding 302. The exterior section 402 is in magnetic contact with the parallel section 304 and extends perpendicular to the parallel section 304. By including an exterior section 402, the magnetic pathway 314 is further reduced and may further increase magnetic coupling and a coupling coefficient between the primary pad 126 and the secondary pad 128. In addition, the exterior section 402 may reduce stray electromagnetic radiation in a direction away from the WPT pads 126, 128, which may increase safety, may reduce a need for other shielding, may make passing of governmental emission standards easier, etc.

Note that the exterior section 402 of FIG. 4A aligns with an exterior shape of the parallel section 304, which is square. In other embodiments, the parallel section 304 is shaped as a rectangle, a circle, an oval or other shape and the exterior section 402 may follow the exterior edge of the parallel section 304 or may be shaped differently.

As with the chimney sections 306, 318, the exterior section 402 may extend in a direction from the parallel section 304 toward the winding 302 and a distance at least a thickness of the winding 302 and/or a distance of the winding 302 beyond the parallel section 304, where the thickness is measured in a direction perpendicular to the ferrite structure. In another embodiment, the exterior section 402 extends a distance beyond a thickness of the winding 302 and/or a distance of the winding 302 beyond the parallel section 304.

Figure 5A:
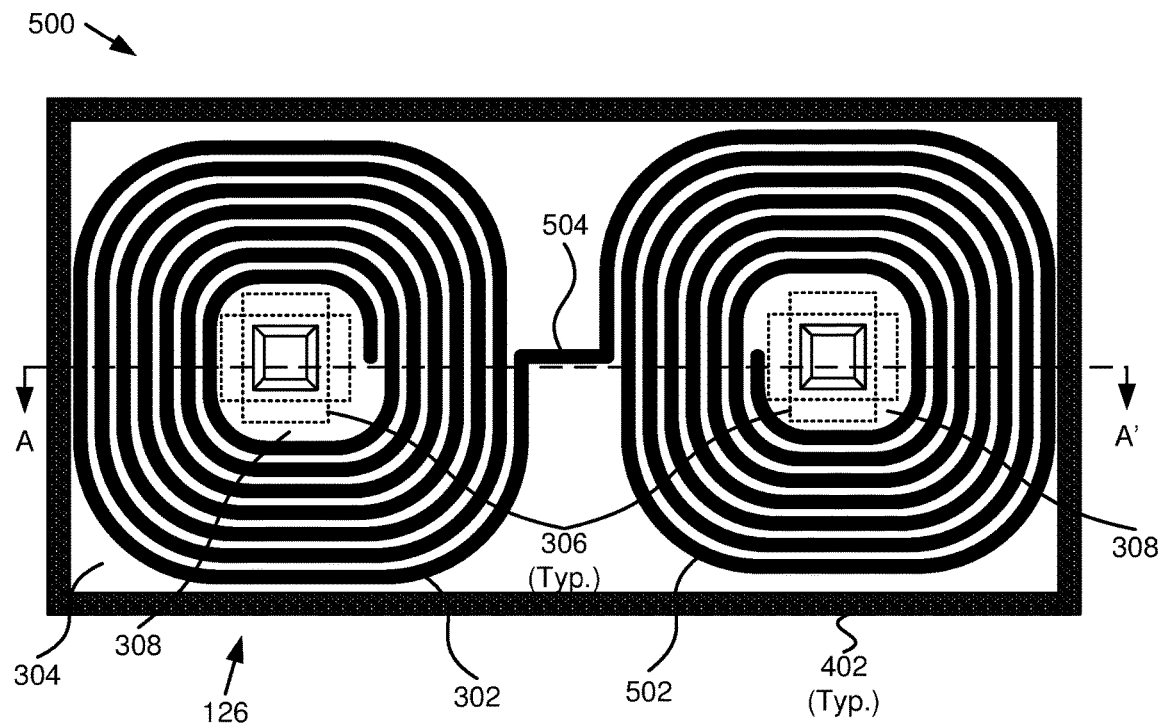
FIG. 5A is a schematic block diagram plan view of one embodiment of a two winding WPT pad with a pyramid-shaped ferrite chimney in a center and a ferrite chimney exterior edge of the WPT pad.
Figure 5B:
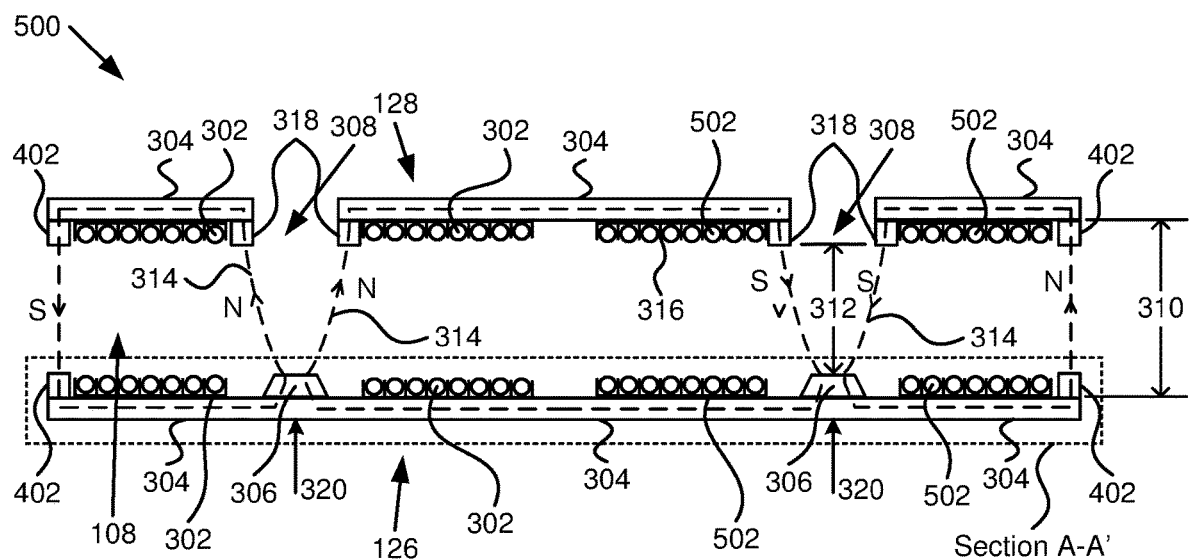
FIG. 5B is a schematic block diagram section view of a WPT pad represented in FIG. 5A along with an opposing WPT pad with a chimney section.

FIG. 5A is a schematic block diagram plan view of one embodiment 500 of a two winding WPT pads 126, 128 with a ferrite chimney in a center and a chimney section along an exterior edge of the WPT pad (e.g. 126 or 128). FIG. 5B is a schematic block diagram section view of a WPT pad 126 represented in FIG. 5A as well as an opposing WPT pad 128 with a chimney section 318. In the embodiment, the ferrite structure is adjacent to a first winding 302 and a second winding 502. The windings 302, 502 are connected and are wound to produce a north pole at a center section 308 of a first winding 302 and a south pole at the center section 308 of the second winding 502, or vice versa. The windings 302, 502 are adjacent to a parallel section 304 of the ferrite structure and include a chimney section 306 for each winding 302, 502. As described for the embodiments 300, 400 of FIGS. 3A, 3B, 4A and 4B, the distance 312 between chimney sections 306 is less than the distance 310 between the parallel sections 304. The magnetic pathways 314 are different than the embodiments 300, 400 of FIGS. 3A, 3B, 4A and 4B.

FIG. 5B depicts section views of a primary pad 126 and a secondary pad 128 and the windings 302, 502 may include separators 316. The magnetic pathways 314 include a north pole at the chimney sections 306, 318 of the first winding 302 and a south pole at the chimney sections 306, 318 of the second winding 502 with opposing poles at the edges of the WPT pads 126, 128. Dual windings 302, 502 provide advantages in some instances, such as a stronger electromagnetic field between the windings 302, 502.

One embodiment of WPT pads 126, 128 with two windings 302, 502 (not shown) includes chimney sections 306, 318 for both windings 302, 502 without exterior sections 402. In the embodiment 500 depicted in FIGS. 5A and 5B, the WPT pads 126, 128 include exterior sections 402 on the exterior edges of the parallel section 304 of the ferrite structure. Note that one WPT pad (e.g. primary pad 126) may include an exterior section 402 while the opposite WPT pad (e.g. secondary pad 128) may exclude exterior sections 402, or vice versa. As with the other described embodiments 300, 400, one WPT pad (e.g. 126) includes a pyramid-shaped chimney section located at the center point of the center point 320 of each winding 302, 502 and the center section 308 of the opposing WPT pad (e.g. 128) may be void of ferrite material in some embodiments, or may include ferrite material in the center section 308. In addition, the parallel section 304 and/or exterior section 402 may be shaped differently than shown, as described with regard to the embodiments 300, 400 of FIGS. 3A, 3B, 4A and 4B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer ("WPT") pad comprising:
 a winding comprising a conductor, wherein the conductor is wound in a planar configuration, the winding comprising a center point about which the winding is wound; and
 a ferrite structure comprising:
  a parallel section located on a side of the winding with at least a portion in parallel with the winding; and
  a chimney section in magnetic contact with the parallel section and located at the center point of the winding, the chimney section extending perpendicular to the parallel section,
  wherein the chimney section extends in a direction from the parallel section toward the winding, the chimney section comprising a top distal to the parallel section and sides between the top and the parallel section and wherein the sides of the chimney section comprise a slope wherein each side is wider at the parallel section than at the top of the chimney section and each side of the chimney section is continuous from the parallel section to the top.

2. The WPT pad of claim 1, wherein the slope of the sides is chosen to accommodate an expected amount of magnetic flux from the parallel section through the chimney section and through the top wherein the slope accommodates the expected amount of magnetic flux without saturation of the chimney section.

3. The WPT pad of claim 1, wherein the top comprises a width sized to accommodate an expected magnetic flux through the top without saturation of the chimney section.

4. The WPT pad of claim 1, wherein the chimney section extends away from the parallel section a distance at least a thickness of the winding, the thickness measured in a direction perpendicular to the parallel section of the ferrite structure.

5. The WPT pad of claim 4, wherein the chimney section extends a distance beyond the thickness of the winding.

6. The WPT pad of claim 1, wherein the chimney section is positioned within a center section of the winding.

7. The WPT pad of claim 1, wherein the ferrite structure further comprises an exterior section located exterior to an outside edge of the winding, the outside edge distal to the chimney section, wherein the exterior section is in magnetic contact with the parallel section and extends perpendicular to the parallel section.

8. The WPT pad of claim 7, wherein the exterior section extends in a direction from the parallel section toward the winding and a distance at least a thickness of the winding, the thickness measured in a direction perpendicular to the ferrite structure.

9. The WPT pad of claim 1, wherein an end of the winding is located at an exterior edge of a center section about the center point and is wound in a circular pattern that expands from the center point within the center section, wherein each succeeding lap of the winding is external to a previous lap of the winding.

10. The WPT pad of claim 9, wherein each lap of the winding is within a same plane, the plane parallel to the parallel section of the ferrite structure.

11. The WPT pad of claim 1, wherein the WPT pad comprises two or more windings, wherein each winding comprises a parallel section of a ferrite structure associated with the winding and a center section, each center section comprising a chimney section of the ferrite structure associated with the winding.

12. The WPT pad of claim 11, wherein the ferrite structures of each of the two or more windings are adjacent to each other and are magnetically coupled.

13. The WPT pad of claim 1, wherein the WPT pad is configured to couple with an opposing WPT pad, wherein the WPT pad is one of a transmitter pad that transmits power wirelessly to an opposing WPT pad that is a secondary pad and secondary pad that receives power wirelessly from an opposing WPT pad that is a transmitter pad.

14. The WPT pad of claim 13, wherein the opposing WPT pad comprises a center section and a chimney section on each side of the center section adjacent to a winding of the opposing WPT pad.

15. The WPT pad of claim 1, wherein the WPT pad is part of a wireless power transfer system that transfers power wirelessly to a vehicle.

16. A wireless power transfer ("WPT") pad comprising:
 a winding comprising a conductor, wherein the conductor is wound in a planar configuration, the winding comprising a center point about which the winding is wound; and
 a ferrite structure comprising:
  a parallel section located on a side of the winding with at least a portion in parallel with the winding;
  a chimney section in magnetic contact with the parallel section and located at the center point of the winding, the chimney section extending perpendicular to the parallel section, wherein the chimney section extends in a direction from the parallel section toward the winding, the chimney section comprising a top distal to the parallel section and sides between the top and the parallel section, the sides of the chimney section comprising a slope wherein each side is wider at the parallel section than at the top of the chimney section and each side of the chimney section is continuous from the parallel section to the top; and an exterior section located exterior to an outside edge of the winding, the outside edge distal to the chimney section, wherein the exterior section is in magnetic contact with the parallel section and extends perpendicular to the parallel section.

17. The WPT pad of claim 16, wherein the chimney section and the exterior section each extend away from the parallel section a distance at least a thickness of the winding, the thickness measured in a direction perpendicular to the parallel section of the ferrite structure.

18. A wireless power transfer ("WPT") system comprising:

a resonant converter that receives power from a power source; and a WPT pad connected to the resonant converter, the WPT pad receiving power from the resonant converter, the WPT pad comprising:

a winding comprising a conductor, wherein the conductor is wound in a planar configuration, the winding comprising a center point about which the winding is wound; and a ferrite structure comprising a parallel section located on a side of the winding with at least a portion in parallel with the winding, and a chimney section in magnetic contact with the parallel section and located at the center point of the winding, the chimney section extending perpendicular to the parallel section, wherein the chimney section extends in a direction from the parallel section toward the winding, the chimney section comprising a top distal to the parallel section and sides between the top and the parallel section and wherein the sides of the chimney section comprise a slope wherein each side is wider at the parallel section than at the top of the chimney section and each side is continuous from the parallel section to the top.

* * * * *